US010694181B2

(12) United States Patent
Zhang et al.

(10) Patent No.: US 10,694,181 B2
(45) Date of Patent: Jun. 23, 2020

(54) BILATERAL FILTERS IN VIDEO CODING WITH REDUCED COMPLEXITY

(71) Applicant: QUALCOMM Incorporated, San Diego, CA (US)

(72) Inventors: Li Zhang, San Diego, CA (US); Jianle Chen, San Diego, CA (US); Wei-Jung Chien, San Diego, CA (US); Marta Karczewicz, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 24 days.

(21) Appl. No.: 15/879,359

(22) Filed: Jan. 24, 2018

(65) Prior Publication Data
US 2018/0220130 A1 Aug. 2, 2018

Related U.S. Application Data
(60) Provisional application No. 62/451,555, filed on Jan. 27, 2017.

(51) Int. Cl.
*H04N 19/117* (2014.01)
*H04N 19/176* (2014.01)
(Continued)

(52) U.S. Cl.
CPC ........... *H04N 19/117* (2014.11); *H04N 19/14* (2014.11); *H04N 19/159* (2014.11);
(Continued)

(58) Field of Classification Search
CPC .... H04N 19/182; H04N 19/86; H04N 19/117; H04N 19/14; H04N 19/82; H04N 19/159;
(Continued)

(56) References Cited

U.S. PATENT DOCUMENTS 9,344,729 B1 * 5/2016 Grange ................ H04N 19/103
9,930,366 B2 * 3/2018 Zheng ................. H04N 19/105
(Continued)

FOREIGN PATENT DOCUMENTS

WO 2015191834 A1 12/2015

OTHER PUBLICATIONS

ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.
(Continued)

*Primary Examiner* — Tung T Vo
(74) *Attorney, Agent, or Firm* — Shumaker & Sieffert, P.A.

(57) ABSTRACT

An example method of filtering a reconstructed block of video data includes obtaining, by one or more processors, reconstructed samples of a current block of the video data; and selectively bilaterally filtering, by the one or more processors, the reconstructed samples of the current block to generate a filtered current block. In this example, selectively bilaterally filtering the reconstructed samples of the current block comprises refraining from bilaterally filtering at least one reconstructed sample of the current block such that the filtered current block includes at least one non-bilaterally filtered sample.

14 Claims, 11 Drawing Sheets

(51) Int. Cl.
*H04N 19/82* (2014.01)
*H04N 19/159* (2014.01)
*H04N 19/186* (2014.01)
*H04N 19/14* (2014.01)
*H04N 19/86* (2014.01)
*H04N 19/182* (2014.01)
*H04N 19/436* (2014.01)

(52) U.S. Cl.
CPC ......... *H04N 19/176* (2014.11); *H04N 19/182* (2014.11); *H04N 19/186* (2014.11); *H04N 19/82* (2014.11); *H04N 19/86* (2014.11); *H04N 19/436* (2014.11)

(58) Field of Classification Search
CPC ... H04N 19/186; H04N 19/176; H04N 19/436
USPC .................................................... 375/240.26
See application file for complete search history.

(56) References Cited

U.S. PATENT DOCUMENTS

| | | | | |
|---|---|---|---|---|
| 2006/0251330 | A1* | 11/2006 | Toth ...................... | H04N 19/52 382/236 |
| 2007/0171980 | A1 | 7/2007 | Lee | |
| 2007/0206871 | A1 | 9/2007 | Jalil et al. | |
| 2008/0240592 | A1* | 10/2008 | Lee ........................ | H04N 19/82 382/238 |
| 2010/0002951 | A1* | 1/2010 | Zhai ...................... | G06K 9/3266 382/266 |
| 2010/0239187 | A1 | 9/2010 | Yea et al. | |
| 2011/0103490 | A1* | 5/2011 | Kuo ...................... | H04N 19/61 375/240.29 |
| 2012/0236936 | A1* | 9/2012 | Segall .................. | H04N 19/105 375/240.08 |
| 2013/0177078 | A1* | 7/2013 | Lee ...................... | H04N 19/176 375/240.12 |
| 2013/0230106 | A1* | 9/2013 | Song .................... | H04N 19/176 375/240.13 |
| 2014/0369613 | A1* | 12/2014 | Avadhanam ......... | H04N 19/176 382/233 |
| 2017/0366818 | A1 | 12/2017 | Zhang et al. | |
| 2018/0152727 | A1* | 5/2018 | Chuang ................ | H04N 19/563 |
| 2018/0160142 | A1* | 6/2018 | Zhao .................... | H04N 19/105 |
| 2018/0262756 | A1* | 9/2018 | Filippov .............. | H04N 19/184 |

OTHER PUBLICATIONS

Strom J., et al., "Bilateral Filter After Inverse Transform," Joint Video Exploration Team (JVET) of ITU-T SG 16 WP 3 and ISO/IEC JTC 1/SC 29/WG 11, Document: JVET-D0069, 4th Meeting: Chengdu, CN, Oct. 15-21, 2016, 5 pages.

Wang et al., "High Efficiency Video Coding (HEVC) Defect Report," Joint Collaborative Team on Video Coding (JCT-VC) of ITU-T SG 16 WP 3 and ISO/IEC JTC 1/SC 29/WG 11, JCTVC-N1003-v1, 14th Meeting: Vienna, AT, Jul. 25-Aug. 2, 2013, 311 pp.

Chen J., et al., "Algorithm description of Joint Exploration Test Model 3 (JEM3)", 3, JVET Meeting; May 26, 2016-Jun. 1, 2016; Geneva; (The Joint Video Exploration Team of ISO/IEC JTC1/SC29/WG11 and ITU-T SG.16); URL: http://phenix.int-evry_fr/jvet/,, No. JVET-C1001_v1, Jul. 2, 2016 (Jul. 2, 2016), XP030150223, 38 Pages.

Chen J., et al., Algorithm Description of Joint Exploration Test Model4 Joint Video Exploration Team (JVET) of ITU-T SG 16 WP 3 and ISO/IEC JTC 1/SC 29/WG 11, 4th Meeting: Chengdu, Oct. 15-21, 2016, JVET-D1001-v3, 39 pp.

Norkin A., et al., "HEVC Deblocking Filter", IEEE Transactions on Circuits and Systems for Video Technology, Dec. 1, 2012 (Dec. 1, 2012), vol. 22, No. 12, pp. 1746-1754, XP011487156.

Karczewicz M., et al., "Improvements on Adaptive Loop Filter," Joint Video Exploration Team (JVET) of ITU-T SG 16 WP 3 and ISO/IEC JTC 1/SC 29/WG 11, Document: JVET-B0060-v2, 2nd Meeting: San Diego, USA, Feb. 20-26, 2016, XP030150068, URL: http://phenix.int-evry.fr/jvet/., No. JVET-B0060, 6 pages.

Karczewicz M., et al., "EE2.5: Improvements on Adaptive Loop Filter," Joint Video Exploration Team (JVET) of ITU-T SG 16 WP 3 and ISO/IEC JTC 1/SC 29/WG 11, Document: JVET-O0038, 3rd Meeting: Geneva, CH, May 26-Jun. 1, 2016, 4 pages.

Tomasi C., et al., "Bilateral Filtering for Gray and Color Images," in Proceedings of the IEEE International Conference on Computer Vision, 1998,pp. 839-846.

Bross B., et al., "High Efficiency Video Coding (HEVC) Text Specification Draft 10 (for FDIS & Last Call)," 12th Meeting: Geneva, CH, Jan. 14-23, 2013, (Joint Collaborative Team on Video Coding of ISO/IEC JTC 1/SC 29/WG 11 and ITU-T SG 16 WP 3); JCTVC-L1003_v34, Mar. 19, 2013, 310 pages.

Fu C-M., et al., "Sample Adaptive Offset in the HEVC Standard," IEEE Transactions on Circuits and Systems for Video Technology, Institute of Electrical and Electronics Engineers, USA, Dec. 1, 2012, vol. 22, No. 12, pp. 1755-1764, XP011487153, ISSN: 1051-8215, DOI:10.1109/TCSVT.2012.2221529.

Strom, et al., "Bilateral filter strength based on prediction mode," Joint Video Exploration Team (JVET) OF ITU-T SG 16 WP 3 and ISO/IEC JTC 1/SC 29/WG 11, Document: JVET-E0032, 5th Meeting; Geneva, Jan. 12-20, 2017, 3 pp.

Bossen F., et al., "JEM Software Manual," Joint Collaborative Team on Video Coding (JCT-VC) of ITU-T SG16 WP3 and ISO/IEC JTC1/SC29/WG11, Document: JCTVC-Software Manual, Retrieved on Aug. 3, 2016, pp. 1-29.

Yi-Wen Chen et al., "Description of SDR, HDR and 360° Video Coding Technology Proposal by Qualcomm and Technicolor—Low and High Complexity Versions," Joint Video Exploration Team (JVET) of ITU-T SG16WP3 and ISO/IEC JTC 1/SC 29/WG11, 10th Meeting: San Diego, US, Apr. 10-20, 2018—Document JVET-J0021 (43 pp).

International Search Report and Written Opinion—PCT/US2018/015206—ISA/EPO—dated May 2, 2018 (17 pp).

Lee J., et al., "Deblocking Filter Modification for Constrained Intra Prediction," 6 JCT-VC Meeting, 97 MPEG Meeting, Jul. 14, 2011-Jul 22, 2011, Torino, (Joint Collaborative Team on Video Coding of ISO/IEC JTC1/SC29/WG11 and ITU—T SG 16), URL: http://wftp3.1tu.int/av-arch/jctvcsite/, No. JCTVC-F359, Jul. 1, 2011 (Jul. 1, 2011), XP030009382, pp. 1-8.

* cited by examiner

BILATERAL FILTERS IN VIDEO CODING WITH REDUCED COMPLEXITY

This application claims the benefit of U.S. Provisional Application No. 62/451,555 filed Jan. 27, 2017, the entire content of which is hereby incorporated by reference.

TECHNICAL FIELD

This disclosure relates to video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the ITU-T H.265, High Efficiency Video Coding (HEVC) standard, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized.

SUMMARY

In general, this disclosure describes filtering techniques that may be used in a post-processing stage, as part of in-loop coding, or in a prediction stage of video coding. The filtering techniques of this disclosure may be applied to existing video codecs, such as High Efficiency Video Coding (HEVC), or be an efficient coding tool in any future video coding standards.

In one example, a method of filtering a reconstructed block of video data includes obtaining, by one or more processors, reconstructed samples of a current block of the video data; and selectively filtering, by the one or more processors, the reconstructed samples of the current block to generate a filtered current block. In this example, selectively filtering the reconstructed samples of the current block comprises refraining from filtering at least one reconstructed sample of the current block such that the filtered current block includes at least one non-filtered sample and at least one filtered sample.

In another example, an apparatus for filtering a reconstructed block of video data includes a memory configured to store video data; and one or more processors. In this example, the one or more processors are configured to obtain reconstructed samples of a current block of the video data; and selectively filter the reconstructed samples of the current block to generate a filtered current block. In this example, to selectively filter the reconstructed samples of the current block, the one or more processors are configured to refrain from filtering at least one reconstructed sample of the current block such that the filtered current block includes at least one non-filtered sample and at least one filtered sample.

In another example, an apparatus for filtering a reconstructed block of video data includes means for obtaining reconstructed samples of a current block of the video data; and means for selectively filtering the reconstructed samples of the current block to generate a filtered current block. In this example, the means for selectively filtering the reconstructed samples of the current block are configured to refrain from filtering at least one reconstructed sample of the current block such that the filtered current block includes at least one non-filtered sample and at least one filtered sample.

In another example, a computer-readable storage medium stores instructions, that when executed, cause one or more processors of a device for filtering a reconstructed block of video data to obtain reconstructed samples of a current block of the video data, and selectively filter the reconstructed samples of the current block to generate a filtered current block. In this example, the instructions that cause the one or more processors to selectively filter the reconstructed samples of the current block comprise instructions that cause the one or more processors to refrain from filtering at least one reconstructed sample of the current block such that the filtered current block includes at least one non-filtered sample and at least one filtered sample.

The details of one or more aspects of the disclosure are set forth in the accompanying drawings and the description below. Other features, objects, and advantages of the techniques described in this disclosure will be apparent from the description, drawings, and claims.

DETAILED DESCRIPTION

Video coders (e.g., video encoders and video decoders) may perform various filtering operations on video data. For instance, to preserve edges and reduce noises, a video decoder may perform bilateral filtering on a sample of video data by replacing the sample with a weighted average of itself and its neighbors.

It may be generally desirable for a video coder to be able to process multiple blocks of video data in parallel. For instance, a video decoder may reconstruct and filter the samples of several blocks of video data at the same time. By processing multiple blocks of video data in parallel, a video coder may reduce the amount of time required to decode pictures of video data. However, in some cases, it may not be possible to process some blocks of video data in parallel. For instance, if the decoding and/or reconstruction of samples of a current block depends on filtered samples of a neighboring block, it may decrease throughput since the decoding and/or reconstruction of samples of the current block needs to wait till the filtering process of the neighboring block is finished.

In accordance with one or more techniques of this disclosure, a video coder may selectively filter samples of a current block such that the filtering does not prevent parallel processing of neighboring blocks. For instance, a video decoder may bilaterally filter samples of a current block that may be not utilized by neighboring blocks for intra prediction and refrain from bilaterally filtering samples of a current block that may be utilized by neighboring blocks for intra prediction. In this way, a video coder may still obtain some of the benefits of filtering while still being able to process neighboring blocks in parallel.

Figure 1:
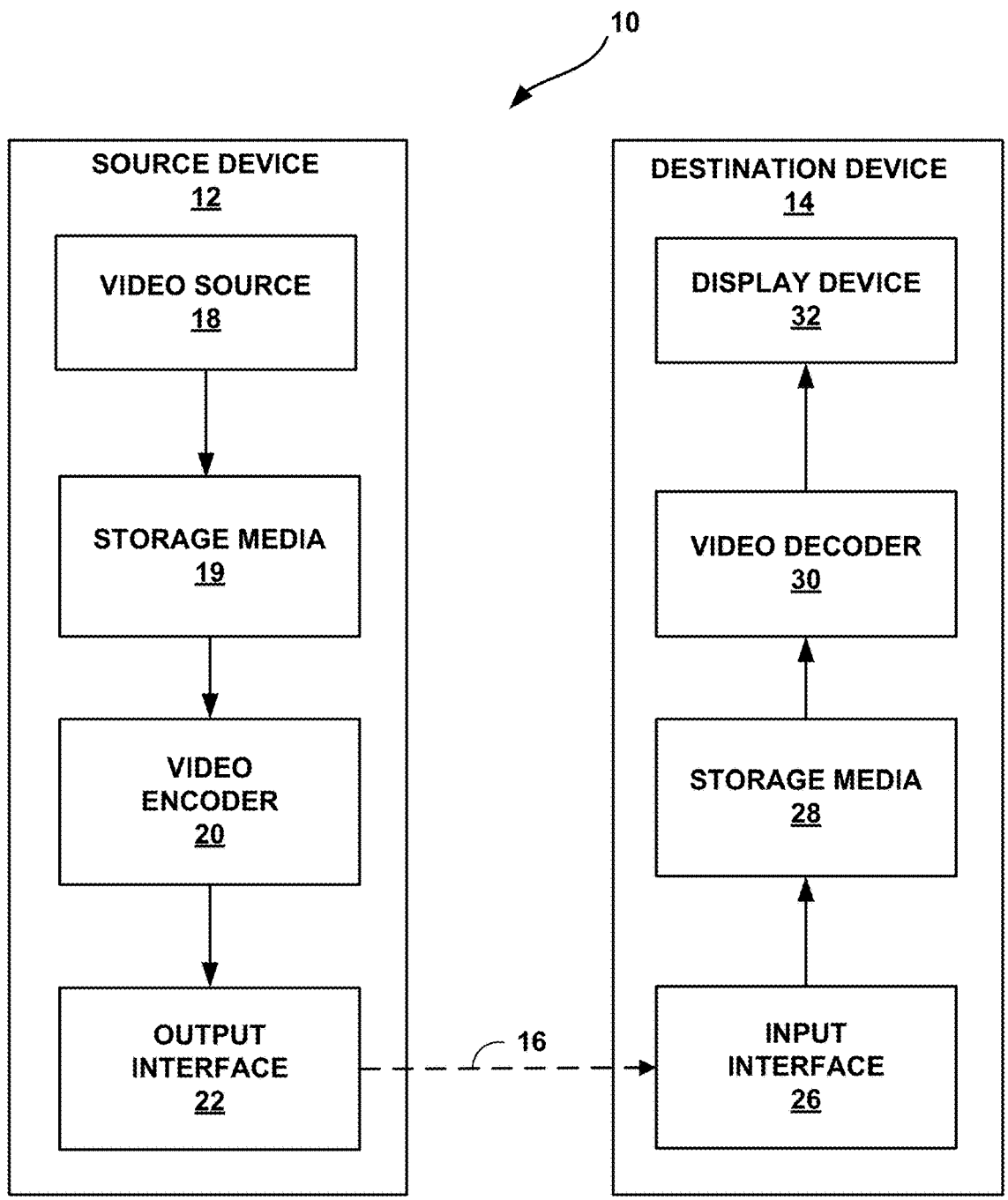
FIG. 1 is a block diagram illustrating an example video encoding and decoding system that may utilize one or more techniques described in this disclosure.

FIG. 1 is a block diagram illustrating an example video encoding and decoding system 10 that may utilize techniques of this disclosure. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, tablet computers, televisions, cameras, display devices, digital media players, video gaming consoles, video streaming device, or the like. In some cases, source device 12 and destination device 14 may be equipped for wireless communication. Thus, source device 12 and destination device 14 may be wireless communication devices. Source device 12 is an example video encoding device (i.e., a device for encoding video data). Destination device 14 is an example video decoding device (i.e., a device for decoding video data).

In the example of FIG. 1, source device 12 includes a video source 18, storage media 19 configured to store video data, a video encoder 20, and an output interface 22. Destination device 14 includes an input interface 26, a storage media 28 configured to store encoded video data, a video decoder 30, and display device 32. In other examples, source device 12 and destination device 14 include other components or arrangements. For example, source device 12 may receive video data from an external video source, such as an external camera. Likewise, destination device 14 may interface with an external display device, rather than including an integrated display device.

The illustrated system 10 of FIG. 1 is merely one example. Techniques for processing video data may be performed by any digital video encoding and/or decoding device. Although generally the techniques of this disclosure are performed by a video encoding device, the techniques may also be performed by a video encoder/decoder, typically referred to as a "CODEC." Source device 12 and destination device 14 are merely examples of such coding devices in which source device 12 generates coded video data for transmission to destination device 14. In some examples, source device 12 and destination device 14 may operate in a substantially symmetrical manner such that each of source device 12 and destination device 14 include video encoding and decoding components. Hence, system 10 may support one-way or two-way video transmission between source device 12 and destination device 14, e.g., for video streaming, video playback, video broadcasting, or video telephony.

Video source 18 of source device 12 may include a video capture device, such as a video camera, a video archive containing previously captured video, and/or a video feed interface to receive video data from a video content provider. As a further alternative, video source 18 may generate computer graphics-based data as the source video, or a combination of live video, archived video, and computer-generated video. Source device 12 may comprise one or more data storage media (e.g., storage media 19) configured to store the video data. The techniques described in this disclosure may be applicable to video coding in general, and may be applied to wireless and/or wired applications. In each case, the captured, pre-captured, or computer-generated video may be encoded by video encoder 20. Output interface 22 may output the encoded video information to a computer-readable medium 16.

Output interface 22 may comprise various types of components or devices. For example, output interface 22 may comprise a wireless transmitter, a modem, a wired networking component (e.g., an Ethernet card), or another physical component. In examples where output interface 22 comprises a wireless receiver, output interface 22 may be configured to receive data, such as the bitstream, modulated according to a cellular communication standard, such as 4G, 4G-LTE, LTE Advanced, 5G, and the like. In some examples where output interface 22 comprises a wireless receiver, output interface 22 may be configured to receive data, such as the bitstream, modulated according to other wireless standards, such as an IEEE 802.11 specification, an IEEE 802.15 specification (e.g., ZigBee™), a Bluetooth™ standard, and the like. In some examples, circuitry of output interface 22 may be integrated into circuitry of video encoder 20 and/or other components of source device 12. For example, video encoder 20 and output interface 22 may be parts of a system on a chip (SoC). The SoC may also include other components, such as a general purpose microprocessor, a graphics processing unit, and so on.

Destination device 14 may receive the encoded video data to be decoded via computer-readable medium 16. Computer-readable medium 16 may comprise any type of medium or device capable of moving the encoded video data from source device 12 to destination device 14. In some examples, computer-readable medium 16 comprises a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14. Destination device 14 may comprise one or more data storage media configured to store encoded video data and decoded video data.

In some examples, encoded data may be output from output interface 22 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 26 of destination device 14 receives information from computer-readable medium 16. The information of computer-readable medium 16 may include syntax information defined by video encoder 20 of video encoder 20, which is also used by video decoder 30, that includes syntax elements that describe characteristics and/or processing of blocks and other coded units, e.g., groups of pictures (GOPs). Input interface 26 may comprise various types of components or devices. For example, input interface 26 may comprise a wireless receiver, a modem, a wired networking component (e.g., an Ethernet card), or another physical component. In examples where input interface 26 comprises a wireless receiver, input interface 26 may be configured to receive data, such as the bitstream, modulated according to a cellular communication standard, such as 4G, 4G-LTE, LTE Advanced, 5G, and the like. In some examples where input interface 26 comprises a wireless receiver, input interface 26 may be configured to receive data, such as the bitstream, modulated according to other wireless standards, such as an IEEE 802.11 specification, an IEEE 802.15 specification (e.g., ZigBee™), a Bluetooth™ standard, and the like. In some examples, circuitry of input interface 26 may be integrated into circuitry of video decoder 30 and/or other components of destination device 14. For example, video decoder 30 and input interface 26 may be parts of a SoC. The SoC may also include other components, such as a general purpose microprocessor, a graphics processing unit, and so on.

Storage media 28 may be configured to store encoded video data, such as encoded video data (e.g., a bitstream) received by input interface 26. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder unit 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

In some examples, video encoder 20 and video decoder 30 may operate according to a video coding standard such as an existing or future standard. Example video coding standards include, but are not limited to, ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multi-View Video Coding (MVC) extensions. In addition, a new video coding standard, namely High Efficiency Video Coding (HEVC) or ITU-T H.265, including its range and screen content coding extensions, 3D video coding (3D-HEVC) and multiview extensions (MV-HEVC) and scalable extension (SHVC), has been developed by the Joint Collaboration Team on Video Coding (JCT-VC) as well as Joint Collaboration Team on 3D Video Coding Extension Development (JCT-3V) of ITU-T Video Coding Experts Group (VCEG) and ISO/IEC Motion Picture Experts Group (MPEG). Ye-Kui Wang et al., "High Efficiency Video Coding (HEVC) Defect Report," Joint Collaborative Team on Video Coding (JCT-VC) of ITU-T SG 16 WP 3 and ISO/IEC JTC 1/SC 29/WG 11, 14$^{th}$ Meeting, Vienna, AT, 25 Jul.-2 Aug. 2013, document JCTVC-N 1003_v1, is a draft HEVC specification.

ITU-T VCEG (Q6/16) and ISO/IEC MPEG (JTC 1/SC 29/WG 11) are now studying the potential need for standardization of future video coding technology with a compression capability that significantly exceeds that of the current HEVC standard (including its current extensions and near-term extensions for screen content coding and high-dynamic-range coding). The groups are working together on this exploration activity in a joint collaboration effort known as the Joint Video Exploration Team (JVET) to evaluate compression technology designs proposed by their experts in this area. The JVET first met during 19-21 Oct. 2015. Jianle Chen et al., "Algorithm Description of Joint Exploration Test Model 3," Joint Video Exploration Team (JVET) of ITU-T SG 16 WP 3 and ISO/IEC JTC 1/SC 29/WG 11, 3$^{rd}$ Meeting, Geneva, CH, 26 May-1 Jun. 2016, document JVET-C1001, is an algorithm description of Joint Exploration Test Model 3 (JEM3).

In HEVC and other video coding specifications, video data includes a series of pictures. Pictures may also be referred to as "frames." A picture may include one or more sample arrays. Each respective sample array of a picture may comprise an array of samples for a respective color component. In HEVC, a picture may include three sample arrays, denoted $S_L$, $S_{Cb}$, and $S_{Cr}$. $S_L$ is a two-dimensional array (i.e., a block) of luma samples. $S_{Cb}$ is a two-dimensional array of Cb chroma samples. $S_{Cr}$ is a two-dimensional array of Cr chroma samples. In other instances, a picture may be monochrome and may only include an array of luma samples.

As part of encoding video data, video encoder 20 may encode pictures of the video data. In other words, video encoder 20 may generate encoded representations of the pictures of the video data. An encoded representation of a picture may be referred to herein as a "coded picture" or an "encoded picture."

To generate an encoded representation of a picture, video encoder 20 may encode blocks of the picture. Video encoder 20 may include, in a bitstream, an encoded representation of the video block. For example, to generate an encoded representation of a picture, video encoder 20 may partition each sample array of the picture into coding tree blocks (CTBs) and encode the CTBs. A CTB may be an N×N block of samples in a sample array of a picture. In the HEVC main profile, the size of a CTB can range from 16×16 to 64×64, although technically 8×8 CTB sizes can be supported.

A coding tree unit (CTU) of a picture may comprise one or more CTBs and may comprise syntax structures used to encode the samples of the one or more CTBs. For instance, each a CTU may comprise a CTB of luma samples, two corresponding CTBs of chroma samples, and syntax structures used to encode the samples of the CTBs. In monochrome pictures or pictures having three separate color planes, a CTU may comprise a single CTB and syntax structures used to encode the samples of the CTB. A CTU may also be referred to as a "tree block" or a "largest coding unit" (LCU). In this disclosure, a "syntax structure" may be defined as zero or more syntax elements present together in a bitstream in a specified order. In some codecs, an encoded picture is an encoded representation containing all CTUs of the picture.

To encode a CTU of a picture, video encoder 20 may partition the CTBs of the CTU into one or more coding blocks. A coding block is an N×N block of samples. In some codecs, to encode a CTU of a picture, video encoder 20 may recursively perform quad-tree partitioning on the coding tree blocks of a CTU to partition the CTBs into coding blocks, hence the name "coding tree units." A coding unit (CU) may comprise one or more coding blocks and syntax structures used to encode samples of the one or more coding blocks. For example, a CU may comprise a coding block of luma samples and two corresponding coding blocks of chroma samples of a picture that has a luma sample array, a Cb sample array, and a Cr sample array, and syntax structures used to encode the samples of the coding blocks. In monochrome pictures or pictures having three separate color planes, a CU may comprise a single coding block and syntax structures used to code the samples of the coding block.

Furthermore, video encoder 20 may encode CUs of a picture of the video data. In some codecs, as part of encoding a CU, video encoder 20 may partition a coding block of the CU into one or more prediction blocks. A prediction block is a rectangular (i.e., square or non-square) block of samples on which the same prediction is applied. A prediction unit (PU) of a CU may comprise one or more prediction blocks of a CU and syntax structures used to predict the one or more prediction blocks. For example, a PU may comprise a prediction block of luma samples, two corresponding prediction blocks of chroma samples, and syntax structures used to predict the prediction blocks. In monochrome pictures or pictures having three separate color planes, a PU may comprise a single prediction block and syntax structures used to predict the prediction block.

Video encoder 20 may generate a predictive block (e.g., a luma, Cb, and Cr predictive block) for a prediction block (e.g., luma, Cb, and Cr prediction block) of a CU. Video encoder 20 may use intra prediction or inter prediction to generate a predictive block. If video encoder 20 uses intra prediction to generate a predictive block, video encoder 20 may generate the predictive block based on decoded samples of the picture that includes the CU. If video encoder 20 uses inter prediction to generate a predictive block of a CU of a current picture, video encoder 20 may generate the predictive block of the CU based on decoded samples of a reference picture (i.e., a picture other than the current picture).

Video encoder 20 may generate one or more residual blocks for the CU. For instance, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the Cb residual block of a CU may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may decompose the residual blocks of a CU into one or more transform blocks. For instance, video encoder 20 may use quad-tree partitioning to decompose the residual blocks of a CU into one or more transform blocks. A transform block is a rectangular (e.g., square or non-square) block of samples on which the same transform is applied. A transform unit (TU) of a CU may comprise one or more transform blocks. For example, a TU may comprise a transform block of luma samples, two corresponding transform blocks of chroma samples, and syntax structures used to transform the transform block samples. Thus, each TU of a CU may have a luma transform block, a Cb transform block, and a Cr transform block. The luma transform block of the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may comprise a single transform block and syntax structures used to transform the samples of the transform block.

Video encoder 20 may apply one or more transforms a transform block of a TU to generate a coefficient block for the TU. A coefficient block may be a two-dimensional array of transform coefficients. A transform coefficient may be a scalar quantity. In some examples, the one or more transforms convert the transform block from a pixel domain to a frequency domain. Thus, in such examples, a transform coefficient may be a scalar quantity considered to be in a frequency domain. A transform coefficient level is an integer quantity representing a value associated with a particular 2-dimensional frequency index in a decoding process prior to scaling for computation of a transform coefficient value.

In some examples, video encoder 20 skips application of the transforms to the transform block. In such examples, video encoder 20 may treat residual sample values may be treated in the same way as transform coefficients. Thus, in examples where video encoder 20 skips application of the transforms, the following discussion of transform coefficients and coefficient blocks may be applicable to transform blocks of residual samples.

After generating a coefficient block, video encoder 20 may quantize the coefficient block. Quantization generally refers to a process in which transform coefficients are quantized to possibly reduce the amount of data used to represent the transform coefficients, providing further compression. In some examples, video encoder 20 skips quantization. After video encoder 20 quantizes a coefficient block, video encoder 20 may generate syntax elements indicating the quantized transform coefficients. Video encoder 20 may entropy encode one or more of the syntax elements indicating the quantized transform coefficients. For example, video encoder 20 may perform Context-Adaptive Binary Arithmetic Coding (CABAC) on the syntax elements indicating the quantized transform coefficients. Thus, an encoded block (e.g., an encoded CU) may include the entropy encoded syntax elements indicating the quantized transform coefficients.

Video encoder 20 may output a bitstream that includes encoded video data. In other words, video encoder 20 may output a bitstream that includes an encoded representation of video data. For example, the bitstream may comprise a sequence of bits that forms a representation of encoded pictures of the video data and associated data. In some examples, a representation of a coded picture may include encoded representations of blocks.

The bitstream may comprise a sequence of network abstraction layer (NAL) units. A NAL unit is a syntax structure containing an indication of the type of data in the NAL unit and bytes containing that data in the form of a raw byte sequence payload (RBSP) interspersed as necessary with emulation prevention bits. Each of the NAL units may include a NAL unit header and encapsulates a RBSP. The NAL unit header may include a syntax element indicating a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

NAL units may encapsulate RBSPs for video parameter sets (VPSs), sequence parameter sets (SPSs), and picture parameter sets (PPSs). A VPS is a syntax structure comprising syntax elements that apply to zero or more entire coded video sequences (CVSs). An SPS is also a syntax structure comprising syntax elements that apply to zero or more entire CVSs. An SPS may include a syntax element that identifies a VPS that is active when the SPS is active. Thus, the syntax elements of a VPS may be more generally applicable than the syntax elements of an SPS. A PPS is a syntax structure comprising syntax elements that apply to zero or more coded pictures. A PPS may include a syntax element that identifies an SPS that is active when the PPS is active. A slice header of a slice may include a syntax element that indicates a PPS that is active when the slice is being coded.

Video decoder 30 may receive a bitstream generated by video encoder 20. As noted above, the bitstream may comprise an encoded representation of video data. Video decoder 30 may decode the bitstream to reconstruct pictures of the video data. As part of decoding the bitstream, video decoder 30 may parse the bitstream to obtain syntax elements from the bitstream. Video decoder 30 may reconstruct pictures of the video data based at least in part on the syntax elements obtained from the bitstream. The process to reconstruct pictures of the video data may be generally reciprocal to the process performed by video encoder 20 to encode the pictures. For instance, video decoder 30 may use inter prediction or intra prediction to generate one or more predictive blocks for each PU of the current CU may use motion vectors of PUs to determine predictive blocks for the PUs of a current CU. In addition, video decoder 30 may inverse quantize coefficient blocks of TUs of the current CU. Video decoder 30 may perform inverse transforms on the coefficient blocks to reconstruct transform blocks of the TUs of the current CU. In some examples, video decoder 30 may reconstruct the coding blocks of the current CU by adding the samples of the predictive blocks for PUs of the current CU to corresponding decoded samples of the transform blocks of the TUs of the current CU. By reconstructing the coding blocks for each CU of a picture, video decoder 30 may reconstruct the picture.

A slice of a picture may include an integer number of CTUs of the picture. The CTUs of a slice may be ordered consecutively in a scan order, such as a raster scan order. In HEVC, a slice is defined as an integer number of CTUs contained in one independent slice segment and all subsequent dependent slice segments (if any) that precede the next independent slice segment (if any) within the same access unit. Furthermore, in HEVC, a slice segment is defined as an integer number of coding tree units ordered consecutively in the tile scan and contained in a single NAL unit. A tile scan is a specific sequential ordering of CTBs partitioning a picture in which the CTBs are ordered consecutively in CTB raster scan in a tile, whereas tiles in a picture are ordered consecutively in a raster scan of the tiles of the picture. As defined in HEVC and potentially other codecs, a tile is a rectangular region of CTBs within a particular tile column and a particular tile row in a picture. Other definitions of tiles may apply to types of blocks other than CTBs.

Video encoder 20 and/or video decoder 30 may perform various filtering operations on video data. For instance, as discussed in greater detail below, video decoder 30 may perform bilateral filtering on a sample of video data by replacing the sample with a weighted average of itself and its neighbors. However, performing bilateral filtering on samples of a current block may reduce the throughput of video decoder 30 because the reconstruction of samples of neighboring blocks of the current block may depend on unfiltered samples of the current block.

In accordance with one or more techniques of this disclosure, video encoder 20 and video decoder 30 may selectively filter samples of a current block such that the filtering does not prevent parallel processing of neighboring blocks. For instance, video decoder 30 may bilaterally filter on samples of a current block that may be utilized by neighboring blocks for intra prediction and refrain from bilaterally filtering samples of a current block that may be not utilized by neighboring blocks for intra prediction. In this way, video decoder 20 and video decoder 30 may still obtain some of the benefits of filtering while still being able to process neighboring blocks in parallel.

Figure 2:
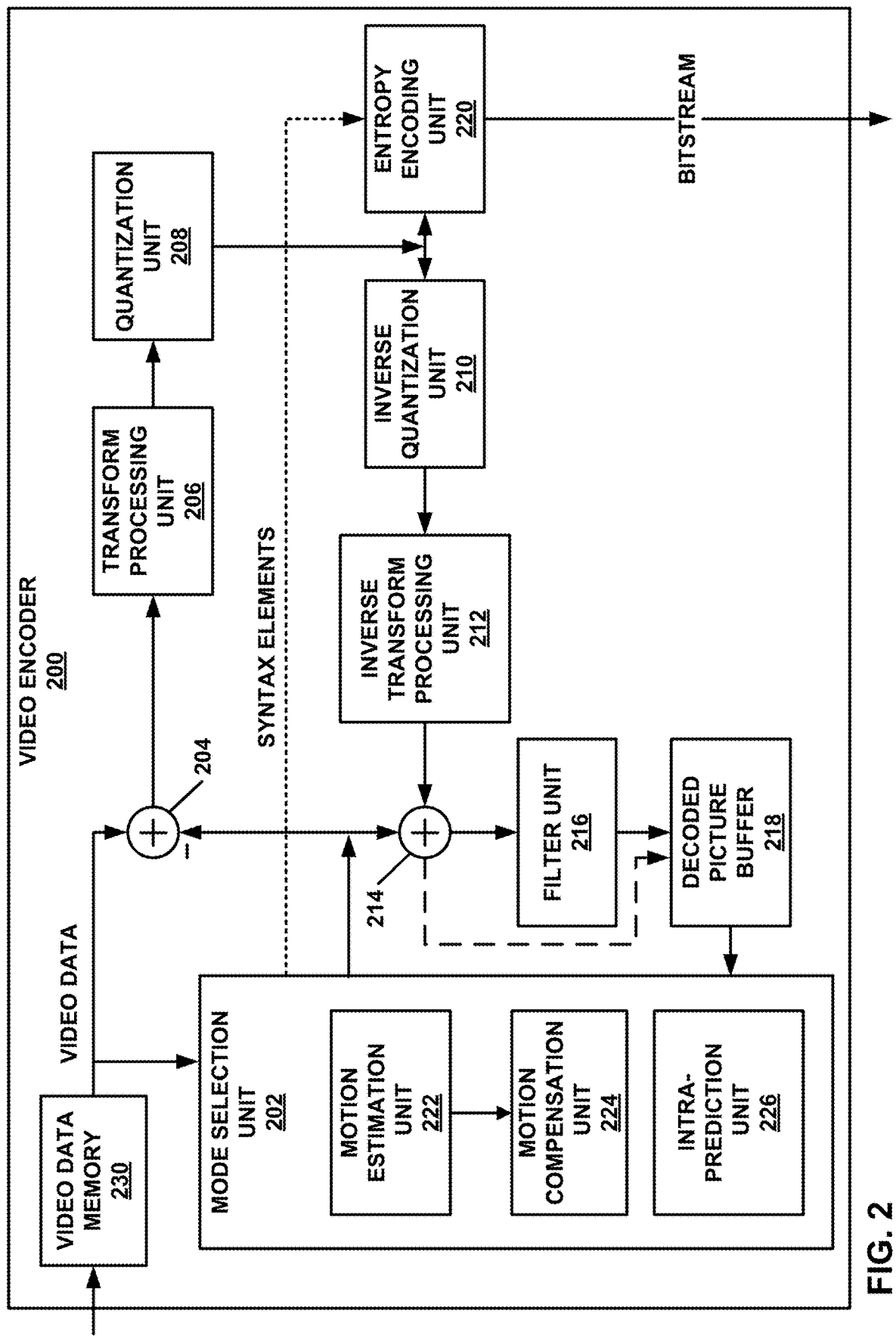
FIG. 2 is a block diagram illustrating an example video encoder that may implement the techniques described in this disclosure.

FIG. 2 is a block diagram illustrating an example video encoder 200 that may perform the techniques of this disclosure. Video encoder 200 represents one example of video encoder 20 of FIG. 1, though other examples are possible. FIG. 2 is provided for purposes of explanation and should not be considered limiting of the techniques as broadly exemplified and described in this disclosure. For purposes of explanation, this disclosure describes video encoder 200 in the context of video coding standards such as the HEVC video coding standard and the H.266 video coding standard in development. However, the techniques of this disclosure are not limited to these video coding standards, and are applicable generally to video encoding and decoding.

In the example of FIG. 2, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220.

Video data memory 230 may store video data to be encoded by the components of video encoder 200. Video encoder 200 may receive the video data stored in video data memory 230 from, for example, video source 18 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Video data memory 230 may also provide temporary storage of outputs from the various units of video encoder 200.

The various units of FIG. 2 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed by software executed by the programmable circuits, video data memory 230 may store the object code of the software that video encoder 200 receives and executes, or another memory (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Figure 3:
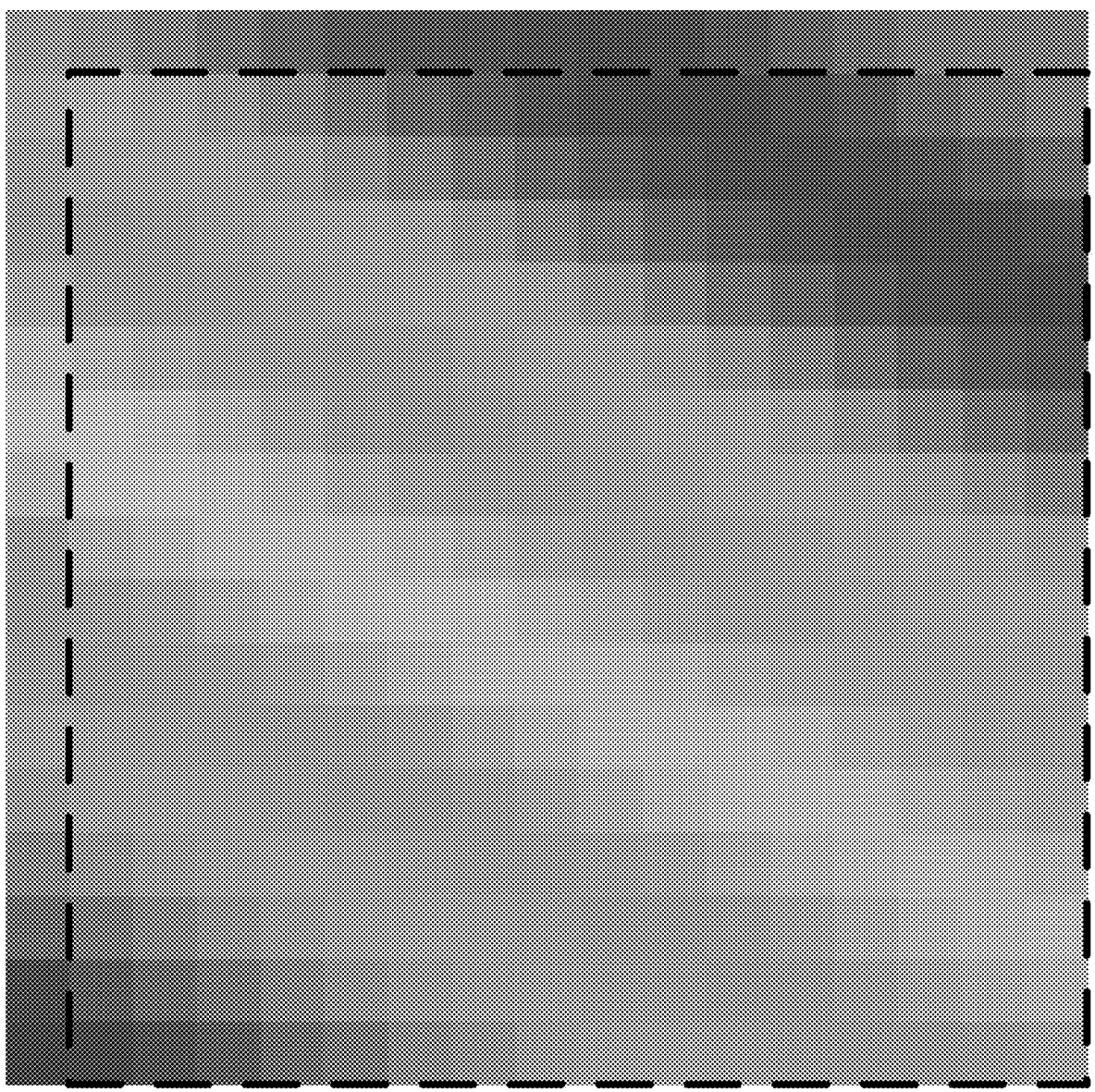
FIG. 3 is a conceptual diagram illustrating a typical example of the Intra prediction for a 16×16 image block.

FIG. 3 is a conceptual diagram illustrating a typical example of the Intra prediction for a 16×16 image block. As shown in FIG. 3, with Intra prediction, the 16×16 image block (in the heavy dashed square) may be predicted by the above and left neighboring reconstructed samples (reference samples) along a selected prediction direction (as indicated by the arrow).

Figure 4A:
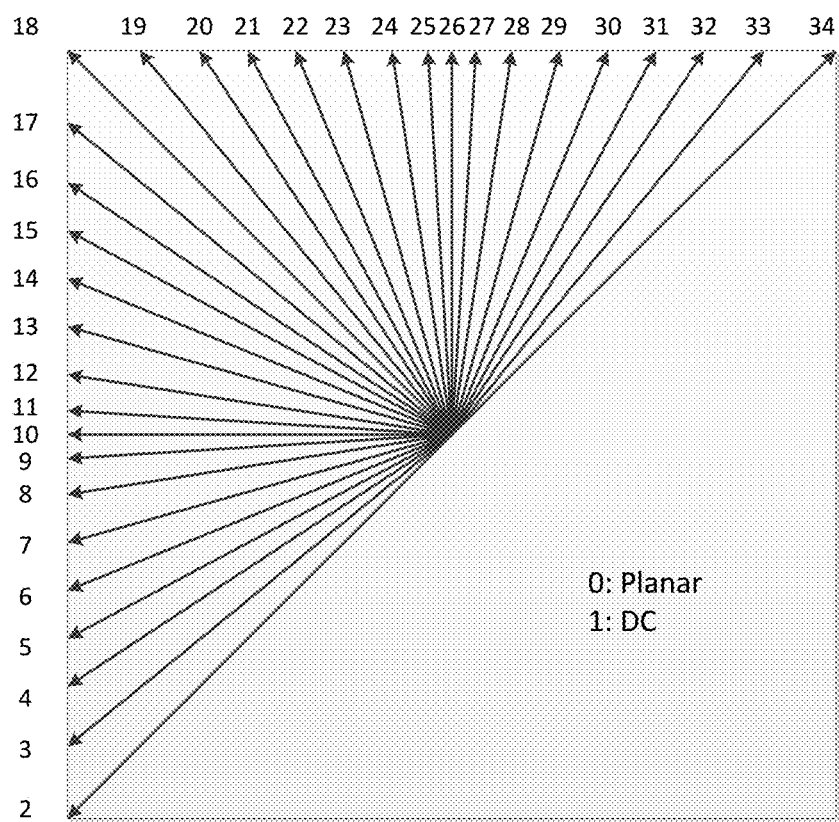
FIGS. 4A and 4B are conceptual diagrams illustrating example of the Intra prediction modes.
Figure 4B:
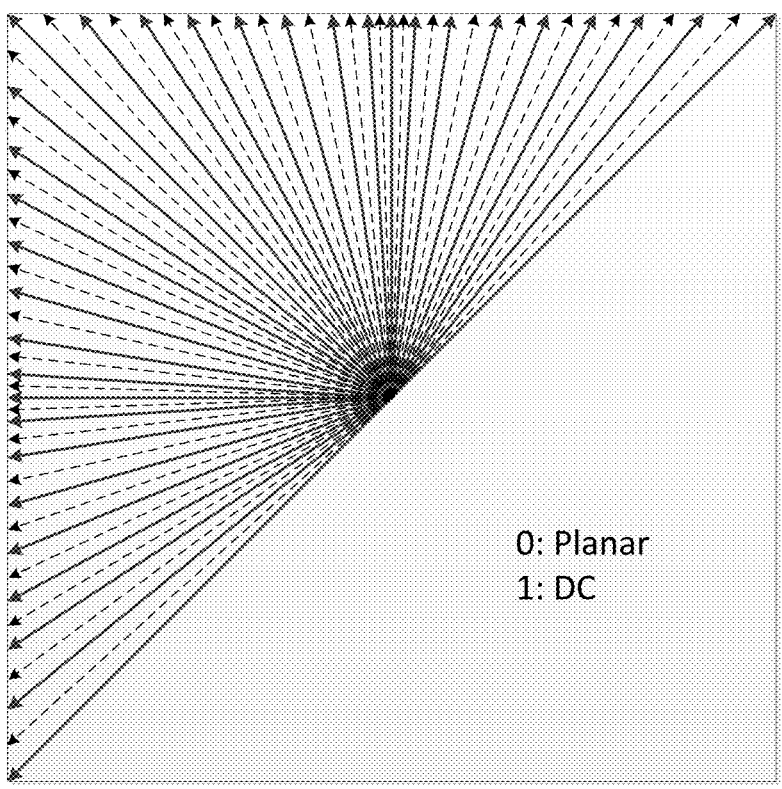

In HEVC, for the Intra prediction of a luma block includes 35 modes, including the Planar mode, DC mode and 33 angular modes. FIGS. 4A and 4B are conceptual diagrams illustrating example of the Intra prediction modes. In HEVC, after the intra prediction block has been generated for VER (vertical) and HOR (horizontal) intra modes, the left-most column and top-most row of the prediction samples may be further adjusted, respectively.

To capture finer edge directions presented in natural videos, the directional intra modes is extended from 33, as defined in HEVC, to 65. The new directional modes are depicted as dashed arrows in FIG. 4B, and the Planar and DC modes remain the same. These denser directional intra prediction modes apply for all block sizes and both luma and chroma intra predictions.

In addition, four-tap instead of two-tap intra interpolation filters may be utilized to generate the intra prediction block which improves the directional intra prediction accuracy. The boundary filter in HEVC may be further extended to several diagonal intra modes, and boundary samples up to four columns or rows are further adjusted using a two-tap (for intra mode 2 & 34) or a three-tap filter (for intra mode 3-6 & 30-33).

Position dependent intra prediction combination (PDPC) is a post-processing for Intra prediction which invokes a combination of HEVC Intra prediction with un-filtered boundary reference samples. In adaptive reference sample smoothing (ARSS), two low pass filters (LPF) are used to process reference samples:

3-tap LPF with the coefficients of [1, 2, 1]/4
5-tap LPF with the coefficients of [2, 3, 6, 3, 2]/16

CCLM is a new chroma prediction method wherein the reconstructed luma blocks and the neighboring chroma block are utilized to derive the chroma prediction block. Additional information about PDPC, ARSS, and CCLM may be found in JVET-D1001, 4th Meeting: Chengdu, CN, 15-21 Oct. 2016 (hereinafter, "JVET-D1001").

Mode selection unit 202 provides the prediction block to residual generation unit 204. Residual generation unit 204 receives a raw, uncoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction.

Video encoder 20 and video decoder 30 may also support asymmetric partitioning for PU sizes of 2N×nU, 2N×nD, nL×2N, and nR×2N for inter prediction.

In examples where mode selection unit does not further partition a CU into PUs, each CU may be associated with a luma coding block and corresponding chroma coding blocks. As above, the size of a CU may refer to the size of the luma coding block of the CU. The video encoder 200 and video decoder 120 may support CU sizes of 2N×2N, 2N×N, or N×2N.

For other video coding techniques such as an intra-block copy mode coding, an affine-mode coding, and linear model (LM) mode coding, as few examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block. Thus, Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. As illustrated by dashed lines, operations of filter unit 216 may be skipped in some examples.

Video encoder 200 stores reconstructed blocks in DPB 218. For instance, in examples where operations of filter unit 216 are not needed, reconstruction unit 214 may store reconstructed blocks to DPB 218. In examples where operations of filter unit 216 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding blocks and the chroma coding blocks.

As discussed above, filter unit 216 may perform one or more filter operations on reconstructed blocks. In some examples, such as in HEVC, filter unit 216 may employ two in-loop filters, including a de-blocking filter (DBF) and a Sample adaptive offset (SAO) filter.

Input to the de-blocking filter coding tool is a reconstructed image after prediction (e.g., intra or inter prediction, but other prediction modes are possible). The deblocking filter performs detection of the artifacts at the coded block boundaries and attenuates the artifacts by applying a selected filter. As described in Norkin et al., "HEVC Deblocking Filter", IEEE Trans. Circuits Syst. Video Technol., 22(12): 1746-1754 (2012), compared to the H.264/AVC deblocking filter, the HEVC deblocking filter has lower computational complexity and better parallel processing capabilities while still achieving significant reduction of the visual artifacts.

Input to the SAO filter is a reconstructed image after invoking deblocking filtering. The concept of SAO is to reduce mean sample distortion of a region by first classifying the region samples into multiple categories with a selected classifier, obtaining an offset for each category, and then adding the offset to each sample of the category, where the classifier index and the offsets of the region are coded in the bitstream. In HEVC, the region (the unit for SAO parameters signaling) is defined to be a coding tree unit (CTU). Two SAO types that can satisfy the requirements of low complexity are adopted in HEVC: edge offset (EO) and band offset (BO). An index of SAO type is coded (which is in the range of [0, 2]).

Figure 5A:
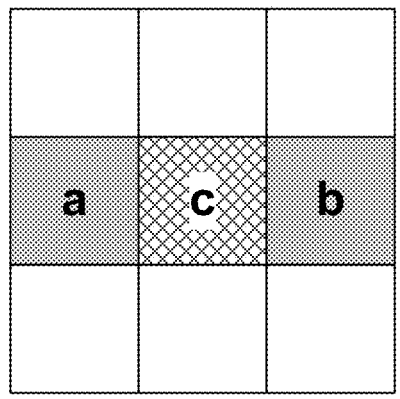
FIGS. 5A-5D each illustrate a 1-D directional pattern for Edge Offset sample classification.
Figure 5B:
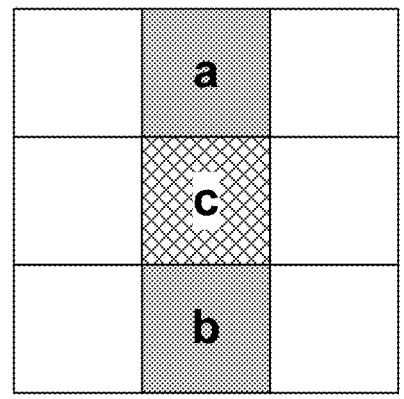
Figure 5C:
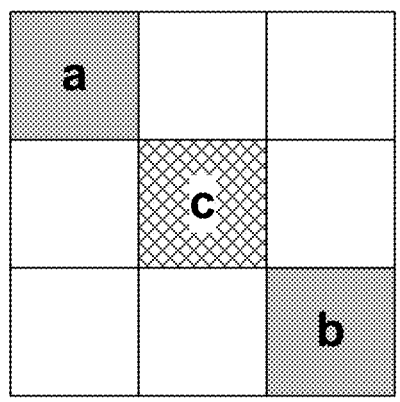
Figure 5D:
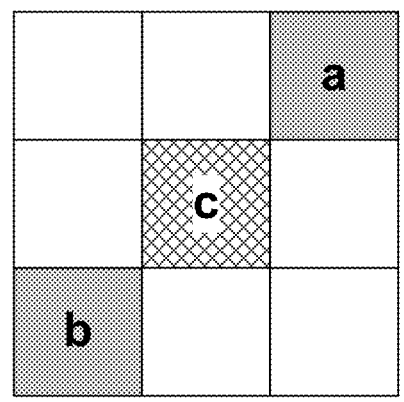

For EO, the sample classification is based on comparison between current samples and neighboring samples according to 1-dimensional (1-D) directional patterns: horizontal, vertical, 135° diagonal, and 45° diagonal. FIGS. 5A-5D each illustrate a 1-D directional pattern for Edge Offset sample classification. FIG. 5A illustrates a horizontal (EO class=0) pattern, FIG. 5B illustrates a vertical (EO class=1) pattern, FIG. 5C illustrates a 135° diagonal (EO class=2) pattern, and FIG. 5D illustrates a 45° diagonal (EO class=3) pattern. EO is described in detail in Fu et al., "Sample adaptive offset in the HEVC standard," IEEE Trans. Circuits Syst. Video Technol., 22(12): 1755-1764 (2012).

According to the selected EO pattern, five categories denoted by edgeIdx in Table 1 are further defined. For edgeIdx equal to 0~3, the magnitude of an offset may be signaled while the sign flag is implicitly coded, i.e., negative offset for edgeIdx equal to 0 or 1 and positive offset for edgeIdx equal to 2 or 3. For edgeIdx equal to 4, the offset is always set to 0 which means no operation is required for this case.

TABLE 1 classification for EO

| Category (edgeIdx) | Condition |
|---|---|
| 0 | c < a && c < b |
| 1 | (c < a && c==b ) \|\| (c==a && c<b) |
| 2 | (c > a && c==b) \|\| (c == a && c > b) |
| 3 | c > a && c > b |
| 4 | None of the above |

For BO, the sample classification is based on sample values. Each color component may have its own SAO parameters. BO implies one offset is added to all samples of the same band. The sample value range is equally divided into 32 bands. For 8-bit samples ranging from 0 to 255, the width of a band is 8, and sample values from 8 k to 8 k+7 belong to band k, where k ranges from 0 to 31. The average difference between the original samples and reconstructed samples in a band (i.e., offset of a band) is signaled to the decoder. There may be no constraint on offset signs. Offsets of four consecutive bands (and in some examples, only offsets of four consecutive bands) and the starting band position may be signaled to the decoder.

To reduce side information, multiple CTUs can be merged together (either copying the parameters from above CTU (through setting sao_merge_left_flag equal to 1) or left CTU (through setting sao_merge_up_flag equal to 1) to share SAO parameters.

In addition to the modified DB and HEVC SAO methods. JEM has included another filtering method, called Geometry transformation-based Adaptive Loop Filtering (GALF). GALF aims improve the coding efficiency of ALF studied in HEVC stage by introducing several new aspects. ALF is aiming to minimize the mean square error between original samples and decoded samples by using Wiener-based adaptive filter. Samples in a picture are classified into multiple categories and the samples in each category are then filtered with their associated adaptive filter. The filter coefficients may be signaled or inherited to optimize the tradeoff between the mean square error and the overhead. A GALF scheme may further improve the performance of ALF, which introduces geometric transformations, such as rotation, diagonal and vertical flip, to be applied to the samples in filter support region depending on the orientation of the gradient of the reconstructed samples before ALF. Input to ALF/GALF is the reconstructed image after invoking SAO.

GALF was proposed in Karczewicz et al., "EE2.5: Improvements on adaptive loop filter", Exploration Team (JVET) of ITU-T SG 16 WP 3 and ISO/IEC JTC 1/SC 29/WG 11, Doc. JVET-B0060, $2^{nd}$ Meeting: San Diego, USA, 20 Feb.-26 Feb. 2016, and Karczewicz et al., "EE2.5: Improvements on adaptive loop filter", Exploration Team (JVET) of ITU-T SG 16 WP 3 and ISO/IEC JTC 1/SC 29/WG 11. Doc. JVET-C0038, $3^{rd}$ Meeting: Geneva, CH, 26 May-1 Jun. 2016, the Geometric transformations-based ALF (GALF). GALF has been adopted to the most recent version of JEM, i.e., JEM3.0. In GALF, the classification is modified with the diagonal gradients taken into consideration and geometric transformations could be applied to filter coefficients. Each 2×2 block is categorized into one out of 25 classes based on its directionality and quantized value of activity. The details are described in the following subsections.

As described in C. Tomasi and R. Manduchi, "Bilateral filtering for gray and color images", in Proc. of IEEE ICCV, Bombay, India, January 1998, Bilateral filtering was may help avoid undesirable over-smoothing for pixels in the edge. The main idea of bilateral filtering is the weighting of neighboring samples takes into account the pixel values themselves to weight more those pixels with similar luminance or chrominance values. A sample located at (i, j) is filtered using its neighboring sample (k, l). The weight ω(i, j, k, l) is the weight assigned for sample (k, l) to filter the sample (i, j), and it is defined as:

$$\omega(i, j, k, l) = e^{\left(-\frac{(i-k)^2+(j-l)^2}{2\sigma_d^2} - \frac{\|I(i,j)-I(k,l)\|^2}{2\sigma_r^2}\right)} \quad (1)$$

In equation (1) above, I(i, j) and I(k, l) are the intensity values of samples (i, j) and (k, l) respectively, ad is the spatial parameter, and $\sigma_r$ is the range parameter. Definitions of the spatial parameter and range parameter are provided below. The filtering process with the filtered sample value denoted by $I_D(i, j)$ may be defined in accordance with equation (2) below.

$$I_D(i, j) = \frac{\sum_{k,l} I(k, l) * \omega(i, j, k, l)}{\sum_{k,l} \omega(i, j, k, l)} \quad (2)$$

The properties (or strength) of the bilateral filter are controlled by these two parameters. Samples located closer to the sample to be filtered, and samples having smaller intensity difference to the sample to be filtered, will have larger weight than samples further away and with larger intensity difference.

Figure 6:
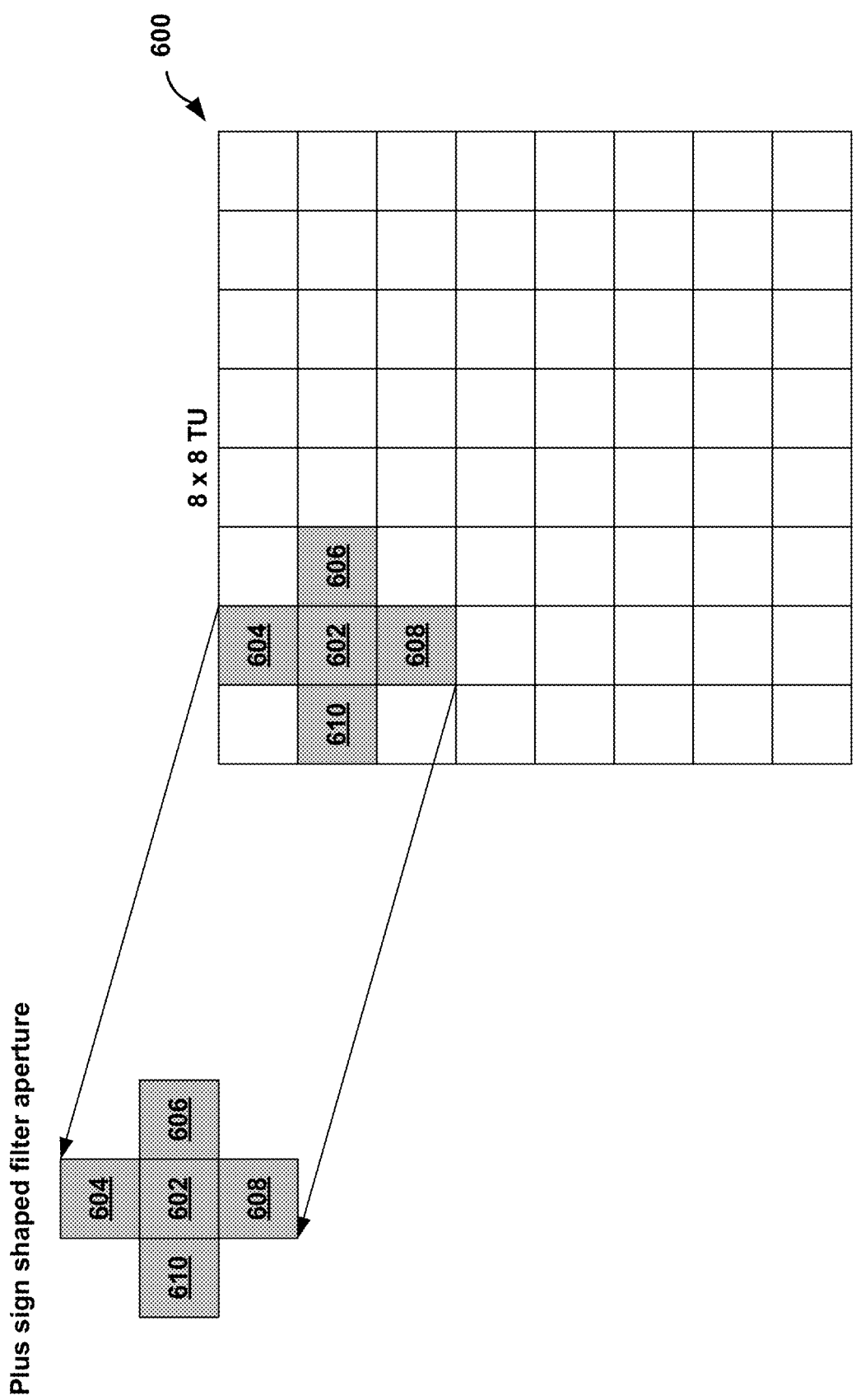
FIG. 6 is a conceptual diagram illustrating a current block that includes a current sample and neighboring samples utilized in bilateral filtering process of the current sample.

As described in Jacob Ström et al., "Bilateral filter after inverse transform", JVET-D0069, 4th Meeting: Chengdu, CN, 15-21 Oct. 2016 (hereinafter, "JVET-D0069"), each reconstructed sample in the transform unit (TU) is filtered using its direct neighboring reconstructed samples only. The filter has a plus sign shaped filter aperture centered at the sample to be filtered, as depicted in FIG. 6. FIG. 6 is a conceptual diagram illustrating current block 600 that includes current sample 602 and neighboring samples 604-610 utilized in bilateral filtering process. The spatial parameter (i.e., $\sigma_d$) may be set based on the transform unit size and the range parameter (i.e., $\sigma_r$) may be set based on the QP used for current block 400. Equations (3) and (4) provide one example of how the spatial and range parameters may be determined.

$$\sigma_d = 0.92 - \frac{\min(TU\ block\ width, TU\ block\ height)}{40} \quad (3)$$

$$\sigma_r = \max\left(\frac{(QP - 17)}{2}, 0.01\right) \quad (4)$$

As described in Jacob Ström et al., "Bilateral filter strength based on prediction mode", JVET-E0032, 5th Meeting: Geneva, CH, 12-20 Jan. 2017 (hereinafter, "JVET-E0032"), to further reduce the coding loss under low delay configuration, the filter strength is further designed to be dependent on the coded mode. For intra-coded blocks, the above equation (3) is still used. While for inter-coded blocks, the following equation (5) is applied.

$$\sigma_d = 0.72 - \frac{\min(TU\ block\ width, TU\ block\ height)}{40} \quad (5)$$

It is noted that the proposed bilateral filtering method may only applied to luma blocks with at least one non-zero coefficients. For chroma blocks and luma blocks with all zero coefficients, the bilateral filtering method may always be disabled.

Figure 7:
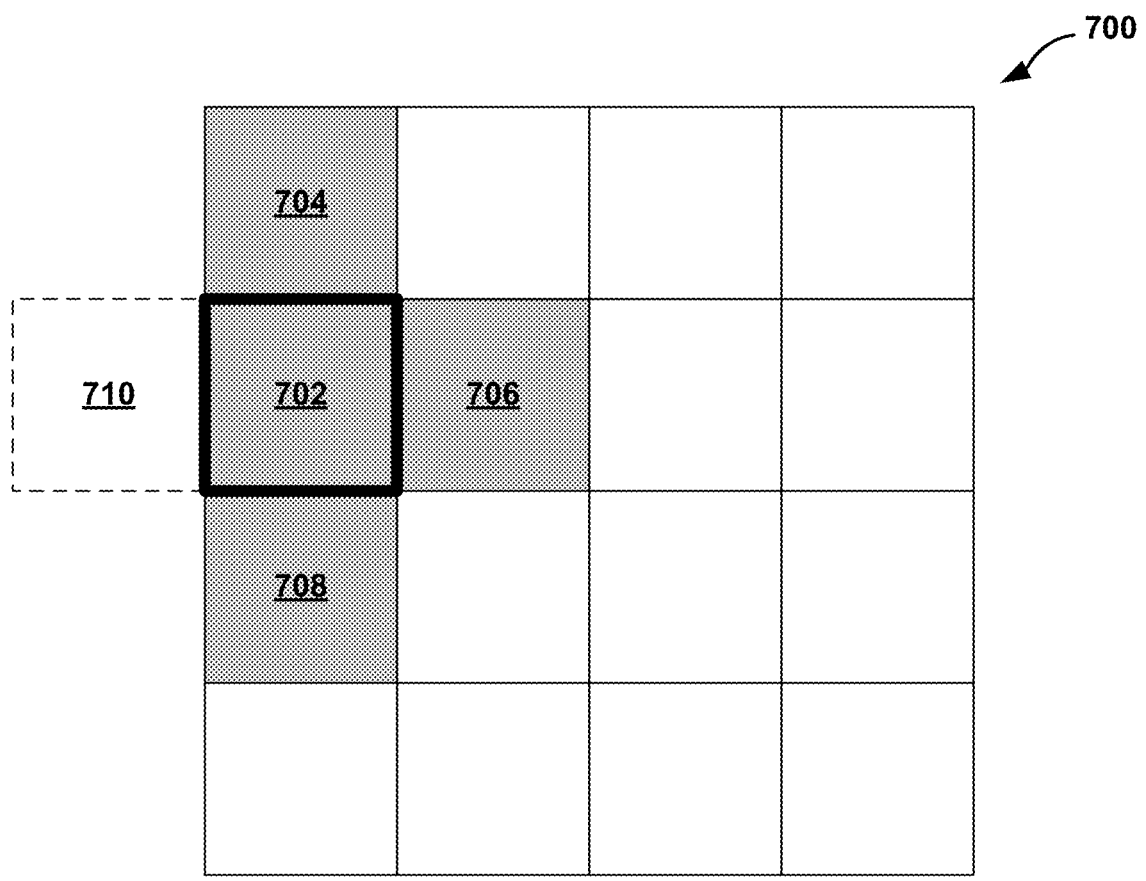
FIG. 7 is a conceptual diagram illustrating how neighboring samples within a current TU (e.g., a 4×4 TU) may be used to filter a current sample.

For samples located at a TU top and left boundaries (i.e., top row and left column), only neighboring samples within current TU are used to filter current sample. FIG. 7 is a conceptual diagram illustrating how neighboring samples within a current TU (e.g., a 4×4 TU) may be used to filter a current sample. FIG. 7 illustrates current TU 700 as including current sample 700 and neighboring samples 704-710. As shown in FIG. 7, left neighboring sample 710 of current sample 702 is not included in current TU 700. As such, left neighboring sample 710 may not be used in the filtering process of current sample 702.

Filter unit 216 may apply a bilateral filter in accordance with the techniques of this disclosure. For instance, filter unit 216 may apply a bilateral filter on reconstructed samples of a current block generated by reconstruction unit 214 in accordance with equation (2), above. After applying the bilateral filter to the reconstructed samples of the current block, filter unit 216 may store a filtered version of the current block in decoded picture buffer 218. The filtered version of the current block may be used as a reference picture in encoding another picture of the video data, as described elsewhere in this disclosure.

The design of bilateral filtering in JVET-D0069 and JVET-E0032 may have the following potential issues. In particular, the bilateral filter is applied right after the reconstruction of one block. Therefore, video encoder 20 may have to wait until the filtering process of a current block is finished for the next neighboring block to be coded. Such a design may decrease the pipeline throughput, which may be undesirable.

The techniques of this disclosure may address the potential issue mentioned above. Some of the proposed techniques may be combined together. The proposed techniques may be applied to other in-loop filtering methods which depend on certain known information to implicitly derive adaptive filter parameters, or filters with explicit signaling of parameters.

In accordance with one or more techniques of this disclosure, filter unit 216 may selectively filter samples of a current block such that the filtering does not prevent parallel processing of neighboring blocks. For instance, filter unit 216 may categorize samples of the current block as either "to be filtered" or "not to be filtered" and only perform the bilateral filtering on samples categorized as to be filtered (i.e., filter unit 216 may refrain from bilaterally filtering samples categorized as not to be filtered). In this way, filter unit 216 may still obtain some of the benefits of filtering while still being able to process neighboring blocks in parallel.

Filter unit 216 may categorize samples of the current block as either to be filtered or not to be filtered in a variety of ways. As one example, filter unit 216 may perform the categorization based on whether the samples may be used for predicting samples of neighboring blocks. As another example, filter unit 216 may perform the categorization based on whether the samples are located in a pre-defined region of the current block. As another example, filter unit 216 may perform the categorization based on whether the samples are actually used for predicting neighboring blocks.

Figure 8:
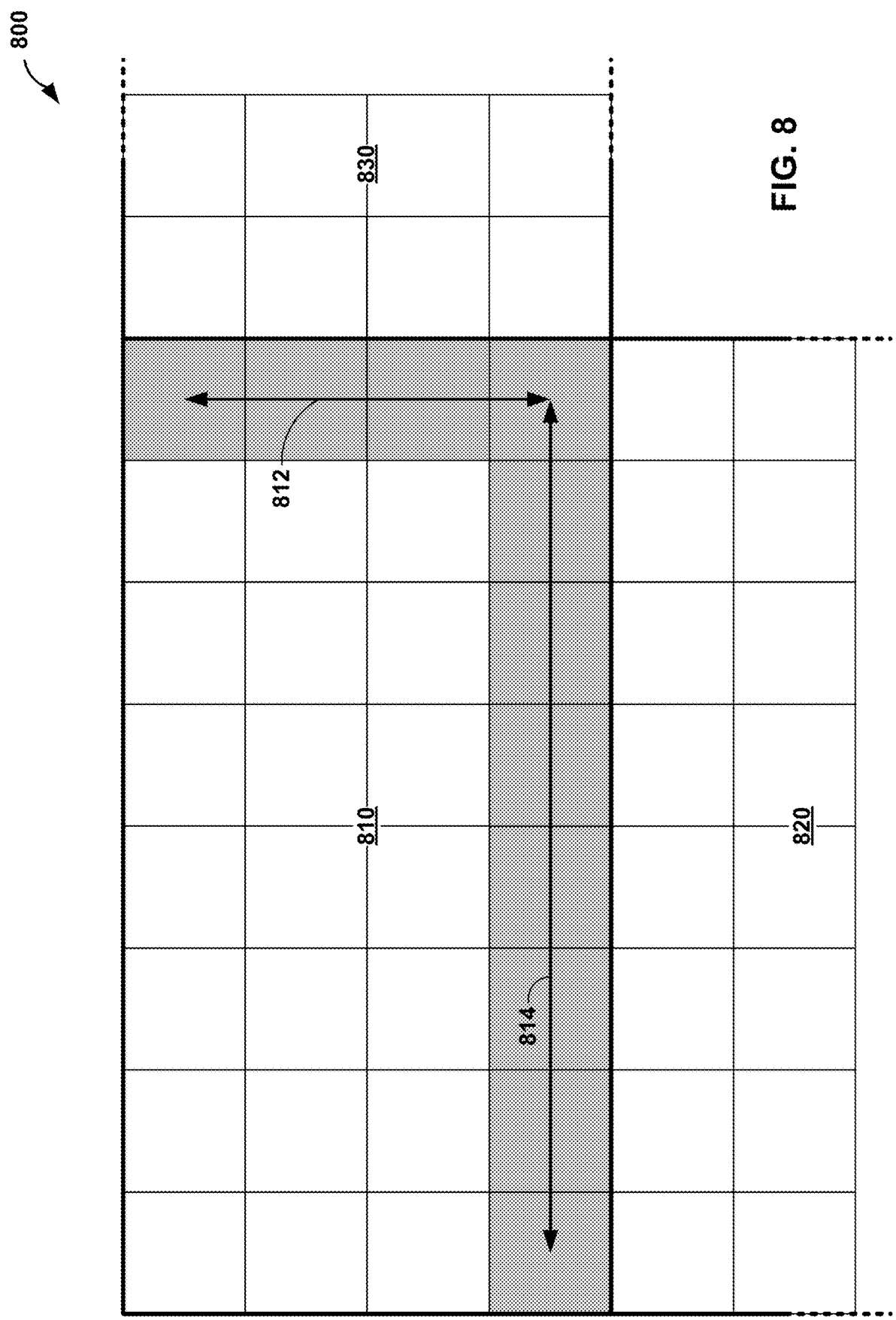
FIG. 8 is a conceptual diagram illustrating one example of how samples may be categorized, in accordance with one or more techniques of the current disclosure.

FIG. 8 is a conceptual diagram illustrating one example of how samples may be categorized, in accordance with one or more techniques of the current disclosure. As shown in FIG. 8, picture 800 includes current block 810, bottom neighboring block 820, and right neighboring block 830.

As discussed above, filter unit 216 may categorize the samples of the current block based on whether the samples may be used to predict samples in neighboring blocks (e.g., in intra prediction or LM mode). For instance, filter unit 216 may categorize, as not to be filtered, all samples of the current block that may possibly used by one or more neighboring blocks for intra prediction without evaluating whether the samples are/will actually used for intra prediction. To illustrate, if a first sample of the current block may be used by neighboring blocks for intra prediction, filter unit 216 may categorize the first sample as not to be filtered and refrain from performing bilateral filtering on the first sample.

On the other hand, if a second sample of the current block may not be used by neighboring blocks for intra prediction, filter unit 216 may categorize the second sample as to be filtered and perform bilateral filtering on the second sample. In some examples, filter unit 216 may determine that samples located in a right most column or a bottom row of the current block (assuming horizontal raster scan order, it is understood that the right most column and bottom row are interpreted as the "leading" column/row and that other columns/rows may be used with other scan orders) may be utilized by neighboring blocks for intra prediction. For instance, in the example of FIG. 8, filter unit 216 may categorize samples in right most column 812 and samples in bottom row 814 as do not filter because it is possible for neighboring blocks 820 and 830 to use samples in right most column 812 and samples in bottom row 814 for intra prediction.

As discussed above, filter unit 216 may categorize the samples of the current block based on whether the samples are located in a pre-defined region of the current block. This technique may be similar to, and overlap with in certain circumstances, the categorization based on whether the samples may be used by neighboring blocks for intra prediction. For instance, the pre-defined region of the current block may include the right most column and bottom row of the current block.

As discussed above, filter unit 216 may perform the categorization based on whether the samples are actually used for prediction of neighboring blocks. To determine which samples of the current block are utilized by neighboring blocks, filter unit 216 may determine, based on information received from mode selection unit 202, whether the neighboring blocks of the current block are coded with intra mode. Responsive to determining that a right neighboring block (e.g., block 830) of the current block is coded using intra prediction, filter unit 216 may determine that samples of the current block that are located in a right most column (e.g., samples in column 812) of the current block are utilized by neighboring blocks for intra prediction. However, responsive to determining that the right neighboring block (e.g., block 830) of the current block is not coded using intra prediction (e.g., is coded using inter prediction), filter unit 216 may determine that samples of the current block that are located in the right most column (e.g., samples in column 812) of the current block are not utilized by neighboring blocks for intra prediction. Similarly, responsive to determining that a bottom neighboring block (e.g., block 820) of the current block is coded using intra prediction, filter unit 216 may determine that samples of the current block that are located in a bottom row (e.g., samples in row 814) of the current block are utilized by neighboring blocks for intra prediction. However, responsive to determining that the bottom neighboring block (e.g., block 820) of the current block is not coded using intra prediction, filter unit 216 may determine that samples of the current block that are located in the bottom row (e.g., samples in row 814) of the current block are not utilized by neighboring blocks for intra prediction.

In some examples, as discussed above, video encoder 20 may use a cross-component linear model (CCLM) prediction mode to predict samples of video data. In CCLM, video encoder 20 may utilize the luma samples of the whole block when performing the chroma intra prediction process of a chroma block. As such, where a neighboring block of the current block relied on luma reconstruction samples (e.g., if the neighboring block is coded using CCLM), filter unit 216 may determine that all of the samples of the current block are actually used for prediction of neighboring blocks. In such examples, filter unit 216 may refrain from performing bilateral filtering on any samples of the current block.

When categorizing samples based on whether the samples may be used for predicting samples of neighboring blocks or based on whether the samples are located in a pre-defined region of the current block, filter unit 216 may avoid having to actually determine which, if any, samples of the current block are actually used for predicting neighboring blocks. By not determining which samples of the current block are actually used for predicting neighboring blocks, filtering unit 216 may reduce the complexity of the filtering process. However, by determining which samples of the current block are actually used for predicting neighboring blocks and only refraining from filtering the samples that are actually used, filtering unit 216 may filter a larger number of samples, which may improve quality/artifact reduction.

In some examples, as opposed to selectively filtering some samples of a current block, filter unit 216 may perform bilateral filtering on all samples of the current block and store two sets of reconstruction blocks/sub-blocks. For instance, filter unit 216 may store a first set that includes non-bilaterally filtered samples of the current block and a second set that includes bilaterally filtered samples of the current block. In some examples, the second set may include samples that are bilaterally filtered but not yet filtered by other in-loop filters, such as deblocking filter.

In some examples, intra prediction unit 226 may always use the first set for performing an intra luma prediction process. In some examples, intra prediction unit 226 may select the first set or the second set for performing luma intra prediction of neighboring blocks based on the intra prediction mode information. For instance, if a neighboring block of current block is coded with the PDPC or ARSS mode or boundary filter is enabled, intra prediction unit 226 may select the first set for the luma intra prediction process of the neighboring block. In some examples, if the chroma mode relies on luma reconstruction samples, e.g., cross-component linear model (CCLM) prediction mode, intra prediction unit 226 may utilize the first set of the corresponding luma block when performing the chroma intra prediction process of a chroma block.

Similarly, the filtering process to the reconstruction of a block/sub-block may be applied after all the intra prediction to the next-coded block is done. Here, the intra prediction may include but not limited to, 1) traditional normal intra prediction using casual reconstructed samples, 2) cross-component linear model (CCLM) prediction.

Video encoder 200 represents an example of a device configured to encode video data, the device including a memory configured to store the video data (e.g., decoded picture buffer 218) and one or more processors configured to obtain reconstructed samples of a current block of the video data; and selectively bilaterally filter the reconstructed samples of the current block to generate a filtered current block, wherein selectively bilaterally filtering the reconstructed samples of the current block comprises refraining from bilaterally filtering at least one reconstructed sample of the current block such that the filtered current block includes at least one non-bilaterally filtered sample.

Figure 9:
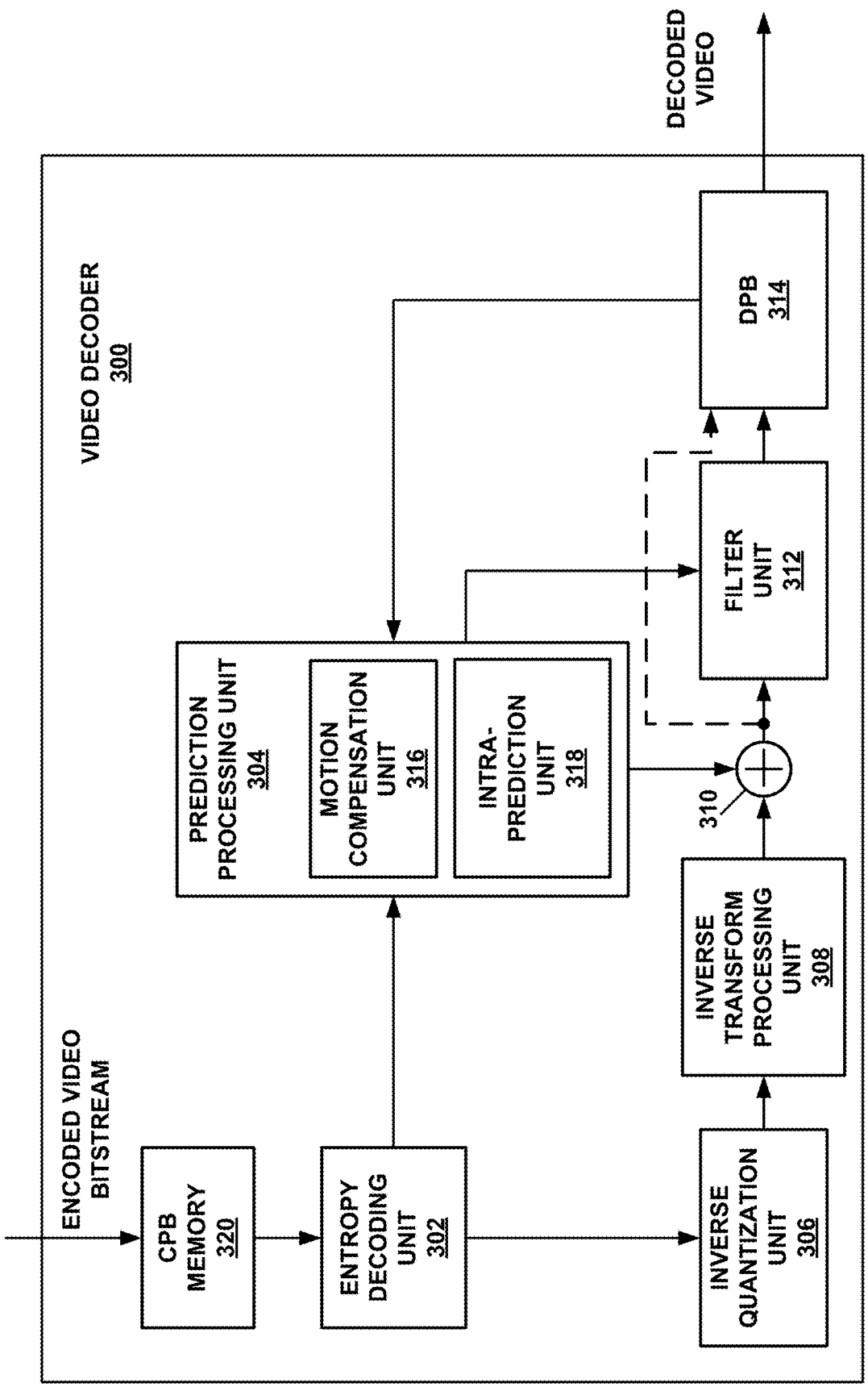
FIG. 9 is a block diagram illustrating an example video decoder that may implement one or more techniques described in this disclosure.

FIG. 9 is a block diagram illustrating an example video decoder 300 that may perform the techniques of this disclosure. Video decoder 300 represents one example of video decoder 30 of FIG. 1, though other examples are possible. FIG. 9 is provided for purposes of explanation and is not limiting on the techniques as broadly exemplified and described in this disclosure. For purposes of explanation, this disclosure describes video decoder 300 is described according to the techniques of JEM and HEVC. However, the techniques of this disclosure may be performed by video coding devices that are configured to other video coding standards.

In the example of FIG. 9, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Prediction processing unit 304 includes motion compensation unit 316 and intra-prediction unit 318. Prediction processing unit 304 may include addition units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from storage media 28 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as dynamic random access memory (DRAM), including synchronous DRAM (SDRAM), magnetoresistive RAM (MRAM), resistive RAM (RRAM), or other types of memory devices. CPB memory 320 and DPB 314 may be provided by the same memory device or separate memory devices. In various examples, CPB memory 320 may be on-chip with other components of video decoder 300, or off-chip relative to those components.

The various units shown in FIG. 9 are illustrated to assist with understanding the operations performed by video decoder 300. The units may be implemented as fixed-function circuits, programmable circuits, or a combination thereof. Similar to FIG. 2, fixed-function circuits refer to circuits that provide particular functionality, and are preset on the operations that can be performed. Programmable circuits refer to circuits that can programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 2).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 2). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. As illustrated by dashed lines, operations of filter unit 312 are not necessarily performed in all examples.

Filter unit 312 may generally perform a filtering process in a matter that is substantially similar to that described with respect to filter unit 216 (FIG. 1). For instance, filter unit 312 may selectively filter samples of a current block such that the filtering does not prevent parallel processing of neighboring blocks. For instance, filter unit 312 may categorize samples of the current block as either "to be filtered" or "not to be filtered" and only perform the bilateral filtering on samples categorized as to be filtered (i.e., filter unit 312 may refrain from bilaterally filtering samples categorized as not to be filtered). In this way, filter unit 312 may still obtain some of the benefits of filtering while still being able to process neighboring blocks in parallel.

Video decoder 300 may store the reconstructed blocks in DPB 314. For instance, filter unit 312 may store filtered reconstructed blocks in DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures from DPB for subsequent presentation on a display device, such as display device 32 of FIG. 1.

Figure 10:
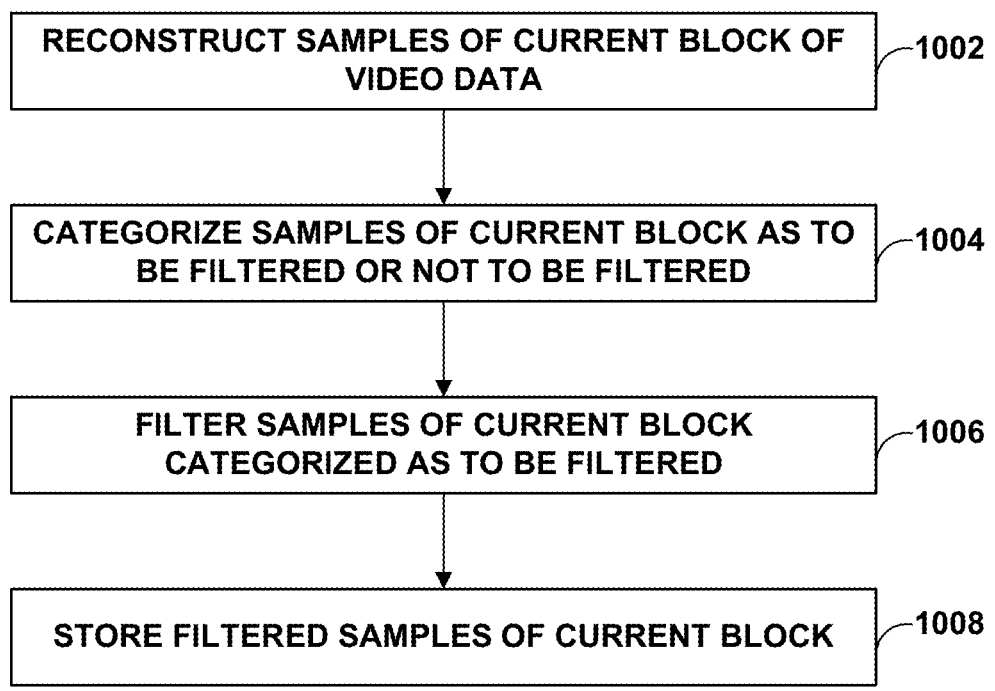
FIG. 10 is a flowchart illustrating an example process for filtering a reconstructed block of video data, in accordance with one or more techniques of this disclosure.

FIG. 10 is a flowchart illustrating an example process for filtering a reconstructed block of video data, in accordance with one or more techniques of this disclosure. For purposes of explanation, the method of FIG. 10 is described below as being performed by video decoder 30/300 and the components thereof (e.g., illustrated in FIGS. 1 and 9), though the method of FIG. 10 may be performed by other video decoders or video encoders. For instance, the method of FIG. 10 may be performed by video encoder 20/200 (e.g., illustrated in FIGS. 1 and 2).

Video decoder 30 may reconstruct samples of a current block of video data (1002). For instance, reconstruction unit 310 may add samples of a residual block (generated by inverse transform processing unit 308) to corresponding samples of a prediction block (generated by prediction processing unit 304) to reconstruct the samples of the current block.

Video decoder 30 may categorize samples of the current block as to be filtered or not to be filtered (1004). As discussed above, filter unit 216 may categorize samples of the current block as either to be filtered or not to be filtered in a variety of ways. As one example, filter unit 216 may perform the categorization based on whether the samples may be used for predicting samples of neighboring blocks. As another example, filter unit 216 may perform the categorization based on whether the samples are located in a pre-defined region of the current block. As another example, filter unit 216 may perform the categorization based on whether the samples are actually used for predicting neighboring blocks. In some examples, categorizing a sample may be interpreted as determining whether to filter. For instance, filter unit 216 may categorize a particular sample by determining whether or not to filter the particular sample and need not assign a value to some attribute or variable for the particular sample.

Video decoder 30 may filter samples of the current block that are categorized as to be filtered (1006). For instance, filter unit 216 may perform a bilateral filtering process on each sample categorized as to be filtered in accordance with equation (2) above. In particular, filter unit 216 may by replacing each sample categorized as to be filtered with a weighted average of itself and its neighbors.

Video decoder 30 may store the filtered samples of the current block (1008). For instance, filter unit 216 may store a filtered current block (that includes the filtered samples of the current block along with unfiltered samples categorized as not to be filtered) in decoded picture buffer 314. Moreover, video decoder 30 may output decoded pictures from DPB for subsequent presentation on a display device, such as display device 32 of FIG. 1.

Certain aspects of this disclosure have been described with respect to the video coding standards for purposes of illustration. However, the techniques described in this disclosure may be useful for other video coding processes, including other standard or proprietary video coding processes not yet developed.

The techniques described above may be performed by video encoder 200 and/or video decoder 120, both of which may be generally referred to as a video coder. Likewise, video coding may refer to video encoding or video decoding, as applicable.

It should be understood that all of the techniques described herein may be used individually or in combination. This disclosure includes several signaling methods which may change depending on certain factors such as block size, palette size, slice type etc. Such variation in signaling or inferring the syntax elements may be known to the encoder and decoder a-priori or may be signaled explicitly in the video parameter set (VPS), sequence parameter set (SPS), picture parameter set (PPS), slice header, at a tile level or elsewhere.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially. In addition, while certain aspects of this disclosure are described as being performed by a single module or unit for purposes of clarity, it should be understood that the techniques of this disclosure may be performed by a combination of units or modules associated with a video coder.

While particular combinations of various aspects of the techniques are described above, these combinations are provided merely to illustrate examples of the techniques described in this disclosure. Accordingly, the techniques of this disclosure should not be limited to these example combinations and may encompass any conceivable combination of the various aspects of the techniques described in this disclosure.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of filtering a reconstructed block of video data, the method comprising:
   obtaining, by one or more processors, reconstructed samples of a current block of the video data; and
   selectively bilaterally filtering, by the one or more processors, the reconstructed samples of the current block to generate a filtered current block, wherein selectively bilaterally filtering the reconstructed samples of the current block comprises:
   categorizing, by the one or more processors, the reconstructed samples of the current block as to be filtered or not to be filtered, wherein categorizing the reconstructed samples comprises:
      determining which samples of the current block are used for prediction of at least one neighboring block;
      categorizing reconstructed samples of the current block that are used for prediction of at least one neighboring block as not to be filtered; and
      categorizing reconstructed samples of the current block that are not used for prediction of at least one neighboring block as to be filtered;
   filtering reconstructed samples of the current block that are categorized as to be filtered; and
   not filtering reconstructed samples of the current block that are categorized as not to be filtered such that the filtered current block includes at least one non-filtered sample and at least one filtered sample, and wherein not filtering a particular reconstructed sample categorized as not to be filtered comprises not replacing a value of the particular reconstructed sample.

2. The method of claim 1, wherein bilaterally filtering a particular sample comprises replacing a value of the particular sample with a weighted average of the value of the particular sample and values of above, below, left, and right neighboring samples of the particular sample, and wherein selectively bilaterally filtering the reconstructed samples of the current block comprises bilaterally filtering at least one reconstructed sample of the current block such that the filtered current block includes at least one bilaterally filtered sample.

3. The method of claim 1, wherein determining which samples of the current block are utilized for prediction of at least one neighboring block comprises:
   in response to determining that a right neighboring block of the current block is coded using intra prediction, determining that samples of the current block that are located in a right most column of the current block are used for prediction of at least one neighboring block; and
   in response to determining that a below neighboring block of the current block is coded using intra prediction, determining that samples of the current block that are located in a bottom row of the current block are used for prediction of at least one neighboring block.

4. The method of claim 1, wherein the current block comprises a current chroma block and a current luma block, and wherein determining which samples of the current block are utilized for prediction of at least one neighboring block comprises:
   in response to determining that a neighboring block of the current chroma block or a corresponding chroma block of the current luma block is coded using a cross-component linear model (CCLM) prediction mode, determining that all samples of the current block are used for prediction of at least one neighboring block.

5. The method of claim 1, the method being executable on a wireless communication device, wherein the device comprises:
   a memory configured to store the video data; and
   a receiver configured to receive the video data and store the video data to the memory.

6. The method of claim 5, wherein the wireless communication device is a cellular telephone and the video data is received by a receiver and modulated according to a cellular communication standard.

7. An apparatus for filtering a reconstructed block of video data, the apparatus comprising:
a memory configured to store video data; and
one or more processors implemented in circuitry and configured to:
   obtain reconstructed samples of a current block of the video data; and
   selectively bilaterally filter the reconstructed samples of the current block to generate a filtered current block, wherein, to selectively bilaterally filter the reconstructed samples of the current block, the one or more processors are configured to:
   categorize the reconstructed samples of the current block as to be filtered or not to be filtered, wherein, to categorize the reconstructed samples, the one or more processors are configured to:
      determine which samples of the current block are used for prediction of at least one neighboring block;
      categorize reconstructed samples of the current block that are used for prediction of at least one neighboring block as not to be filtered; and
      categorize reconstructed samples of the current block that are not used for prediction of at least one neighboring block as to be filtered,
   filter reconstructed samples of the current block that are categorized as to be filtered; and
   not filter reconstructed samples of the current block that are categorized as not to be filtered such that the filtered current block includes at least one non-filtered sample and at least one filtered sample.

8. The apparatus of claim 7, wherein, to bilaterally filter a particular sample, the one or more processors are configured to replace a value of the particular sample with a weighted average of the value of the particular sample and values of above, below, left, and right neighboring samples of the particular sample, and wherein, to selectively bilaterally filter the reconstructed samples of the current block, the one or more processors are configured to bilaterally filter at least one reconstructed sample of the current block such that the filtered current block includes at least one bilaterally filtered sample.

9. The apparatus of claim 7, wherein, to determine which samples of the current block are utilized for prediction of at least one neighboring block, the one or more processors are configured to:
   determine, responsive to determining that a right neighboring block of the current block is coded using intra prediction, that samples of the current block that are located in a right most column of the current block are used for prediction of at least one neighboring block; and
   determine, responsive to determining that a below neighboring block of the current block is coded using intra prediction, that samples of the current block that are located in a bottom row of the current block are used for prediction of at least one neighboring block.

10. The apparatus of claim 7, wherein the current block comprises a current chroma block and a current luma block, and wherein, to determine which samples of the current block are utilized for prediction of at least one neighboring block, the one or more processors are configured to:
   determine, responsive to determining that a neighboring block of the current chroma block or a corresponding chroma block of the current luma block is coded using a cross-component linear model (CCLM) prediction mode, that all samples of the current block are used for prediction of at least one neighboring block.

11. The apparatus of claim 7, wherein the device is a wireless communication device, further comprising:
a receiver configured to receive a bitstream decodable to obtain the reconstructed samples.

12. The apparatus of claim 11, wherein the wireless communication device is a cellular telephone and the bitstream is received by the receiver and modulated according to a cellular communication standard.

13. An apparatus for filtering a reconstructed block of video data, the apparatus comprising:
means for obtaining reconstructed samples of a current block of the video data; and
means for selectively bilaterally filtering the reconstructed samples of the current block to generate a filtered current block, wherein the means for selectively bilaterally filtering the reconstructed samples of the current block comprise:
   means for categorizing the reconstructed samples of the current block as to be filtered or not to be filtered, wherein the means for categorizing the reconstructed samples comprises:
      means for determining which samples of the current block are used for prediction of at least one neighboring block;
      means for categorizing reconstructed samples of the current block that are used for prediction of at least one neighboring block as not to be filtered; and
      means for categorizing reconstructed samples of the current block that are not used for prediction of at least one neighboring block as to be filtered;
   means for filtering reconstructed samples of the current block that are categorized as to be filtered; and
   means for not filtering reconstructed samples of the current block that are categorized as not to be filtered such that the filtered current block includes at least one non-filtered sample and at least one filtered sample.

14. A non-transitory computer-readable storage medium storing instructions, that when executed, cause one or more processors of a device for filtering a reconstructed block of video data to:
obtain reconstructed samples of a current block of the video data; and
selectively bilaterally filter the reconstructed samples of the current block to generate a filtered current block, wherein the instructions that cause the one or more processors to selectively bilaterally filter the reconstructed samples of the current block comprise instructions that cause the one or more processors to:
   categorize the reconstructed samples of the current block as to be filtered or not to be filtered, wherein the instructions that cause the one or more processors to categorize the reconstructed samples comprise instructions that cause the one or more processors to:
      determine which samples of the current block are used for prediction of at least one neighboring block;
      categorize reconstructed samples of the current block that are used for prediction of at least one neighboring block as not to be filtered; and categorize reconstructed samples of the current block that are not used for prediction of at least one neighboring block as to be filtered;
filter reconstructed samples of the current block that are categorized as to be filtered; and
not filter reconstructed samples of the current block that are categorized as not to be filtered such that the filtered current block includes at least one non-filtered sample and at least one filtered sample.

* * * * *